(12) United States Patent
Leachman

(10) Patent No.: US 11,110,304 B2
(45) Date of Patent: Sep. 7, 2021

(54) INTEGRATED EMERGENCY EGRESS EQUIPMENT

(71) Applicant: Bell Helicopter Textron Inc., Forth Worth, TX (US)

(72) Inventor: Joseph Leachman, Keller, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 332 days.

(21) Appl. No.: 15/861,827

(22) Filed: Jan. 4, 2018

(65) Prior Publication Data

US 2019/0118006 A1 Apr. 25, 2019

Related U.S. Application Data

(60) Provisional application No. 62/575,185, filed on Oct. 20, 2017.

(51) Int. Cl.
| | |
|---|---|
| *A62B 1/16* | (2006.01) |
| *B64C 27/00* | (2006.01) |
| *B64D 11/06* | (2006.01) |
| *B64D 25/08* | (2006.01) |
| *B64D 47/02* | (2006.01) |

(52) U.S. Cl.
CPC .............. *A62B 1/16* (2013.01); *B64C 27/006* (2013.01); *B64D 11/0633* (2014.12); *B64D 25/08* (2013.01); *B64D 47/02* (2013.01)

(58) Field of Classification Search
CPC .... B64D 11/0638; B64D 25/08; B64D 47/02; B64C 27/006; A62B 1/16
USPC ..................................................... 244/138 R
See application file for complete search history.

(56) References Cited

U.S. PATENT DOCUMENTS

| 195,024 | A | * | 9/1877 | Knox | ....................... | D07B 1/02 |
| | | | | | | 182/190 |
| 278,763 | A | * | 6/1883 | Barnard | ................... | A62B 1/20 |
| | | | | | | 182/190 |
| 584,376 | A | * | 6/1897 | Landenberger | .......... | D07B 1/02 |
| | | | | | | 182/190 |
| 995,159 | A | * | 6/1911 | Lansden | .................. | D07B 1/02 |
| | | | | | | 182/190 |

(Continued)

FOREIGN PATENT DOCUMENTS

| EP | 3421365 A1 | * | 1/2019 | ........... | B64C 1/1407 |
| EP | 3473546 A1 | * | 4/2019 | ......... | B64D 11/0633 |

(Continued)

OTHER PUBLICATIONS https://aviation.stackexchange.com/questions/73168/what-is-the-length-of-the-escape-rope-in-the-cockpit-specifically-a330-300-if Oct. 27, 2007.*

(Continued)

*Primary Examiner* — Christopher P Ellis
(74) *Attorney, Agent, or Firm* — Edwin S. Flores; Daniel J. Chalker; Chalker Flores, LLP

(57) ABSTRACT

The present invention includes an emergency egress system of a vehicle, including: a rope compartment, wherein the rope compartment is located on or near a vertical plane along a longitudinal axis of the vehicle, within reach of one or more occupant seats; a rope, wherein at least a portion of the rope is stored within the rope compartment and is securely tethered to a portion of a structure of the vehicle; and a rope compartment cover to secure the rope in the rope compartment.

20 Claims, 13 Drawing Sheets

(56) References Cited

U.S. PATENT DOCUMENTS

| | | | | | |
|---|---|---|---|---|---|
| 3,164,801 | A | * | 1/1965 | Nicholl | F21L 2/00 340/949 |
| 3,301,347 | A | * | 1/1967 | Jisaburo | A62B 1/20 182/48 |
| 3,350,553 | A | * | 10/1967 | Cline | F21K 2/06 362/34 |
| 3,833,685 | A | * | 9/1974 | Wambach | C08L 67/02 524/409 |
| 4,058,049 | A | * | 11/1977 | Bech | B63B 21/20 87/8 |
| 4,557,442 | A | * | 12/1985 | Krezak | B64D 25/00 182/100 |
| 4,730,696 | A | * | 3/1988 | Johnson | A62B 1/16 182/100 |
| 4,776,532 | A | | 10/1988 | Haltbrekken | |
| 5,673,988 | A | * | 10/1997 | Fujita | F21K 2/06 362/159 |
| 5,743,354 | A | * | 4/1998 | Hunter | A62B 1/18 182/100 |
| 6,202,588 | B1 | * | 3/2001 | Hebrard | B63C 7/26 116/209 |
| 6,880,702 | B1 | * | 4/2005 | Colorado | A45F 3/02 206/388 |
| 7,942,242 | B1 | * | 5/2011 | O'Connor | A62B 1/14 182/70 |
| 9,547,133 | B2 | * | 1/2017 | Dunn | G02B 6/0006 |
| 2002/0126473 | A1 | * | 9/2002 | Conti | D07B 1/148 362/84 |
| 2002/0158098 | A1 | * | 10/2002 | Price | A62B 1/16 224/674 |
| 2007/0202286 | A1 | * | 8/2007 | Jacobs | D07B 1/148 428/36.3 |
| 2008/0266886 | A1 | * | 10/2008 | Wentland | B64D 47/02 362/470 |
| 2008/0277014 | A1 | * | 11/2008 | Davis, Jr. | A62B 1/16 138/106 |
| 2015/0338063 | A1 | * | 11/2015 | Buckley | F21S 43/145 362/551 |
| 2016/0175622 | A1 | * | 6/2016 | Verstegen | A62B 1/16 254/274 |
| 2016/0311661 | A1 | * | 10/2016 | Schroeder | A61G 7/1051 |
| 2017/0050737 | A1 | * | 2/2017 | Hartman | B64D 25/14 |
| 2017/0080260 | A1 | * | 3/2017 | Pettey | A62B 1/14 |
| 2017/0090088 | A1 | * | 3/2017 | Motoya | G02B 6/001 |
| 2018/0057178 | A1 | * | 3/2018 | Devitt | B64D 25/08 |
| 2019/0232093 | A1 | * | 8/2019 | Simpkins | A62B 1/10 |

FOREIGN PATENT DOCUMENTS

| | | | | |
|---|---|---|---|---|
| WO | WO-2007037563 | A1 | * | 4/2007 ............... A62B 1/16 |
| WO | WO-2009042499 | A1 | * | 4/2009 ............... A62B 1/16 |
| WO | WO-2019111068 | A1 | * | 6/2019 ............... A62B 1/18 |

OTHER PUBLICATIONS

European Patent Office, Communication pursuant to Article 94(3) for EPC for European Application No. 18155896.6 dated May 3, 2019, 4 pp.

Bright "Boeing 737 300/500 aircraft Flight Deck Sliding Window" YouTube, Apr. 15, 2015, p. 1, XP054978282, Retrieved from the internet: https://www.youtube.com/watch?v=TrL-9_Vngck.

European Patent Office, European Search Report for European Application No. 18155896.6 dated May 4, 2018, 6 pp.

European Patent Office, Examination Report for European Application No. 18155896.6 dated May 25, 2018, 6 pp.

U.S. Federal Aviation Administration, "US Federal Aviation Regulations 14 CFR 25.810—Emergency egress assist means and escape routes", Dec. 24, 1964, pp. 25-34, XP055468856, Retrieved from the internet: URL https:/www.go.gov/fdsys/pkg/CFR-2012-title14-vol1/pdf/CFR-2012-title14-vol1-sec25-810.pdf.

Penate, Alfredo "Cockpit evac with rope", Feb. 13, 2009, Retrieved from the internet: https://www.youtube.com/watch?v=_YZGH89WcPc.

European Patent Office, Communication pursuant to Article 94(3) for EPC for European Application No. 18155896.6 dated Nov. 27, 2018, 4 pp.

* cited by examiner

INTEGRATED EMERGENCY EGRESS EQUIPMENT

CROSS-REFERENCE TO RELATED APPLICATIONS

This patent application claims priority to U.S. provisional patent application Ser. No. 62/575,185 filed on Oct. 20, 2017 entitled "Egress Equipment," which is hereby incorporated by reference in its entirety.

STATEMENT OF FEDERALLY FUNDED RESEARCH

Not applicable.

TECHNICAL FIELD OF THE INVENTION

The present invention relates in general to the field of aircraft. In particular, this invention relates to emergency egress equipment.

BACKGROUND OF THE INVENTION

Without limiting the scope of the invention, its background is described in connection with a rotorcraft. One skilled in the art will recognize that the present invention may be used in conjunction with any aircraft.

One example of an aircraft is a rotorcraft. Existing methods and apparatuses for using one of more ropes for emergency egress from an aircraft typically include stowing emergency egress rope equipment in a bag or pouch at an accessible location on the aircraft. Such equipment is considered loose or portable equipment because it can be moved to a designated location and one end can be securely tethered to a structural component when it is needed. However, tethering the rope equipment when it is needed in an emergency costs valuable time, and the rope equipment may not be tethered as securely as it could be.

Methods and apparatuses for tethering emergency egress rope equipment securely before an emergency are desirable.

SUMMARY OF THE INVENTION

In some embodiments of the disclosure, an emergency egress system is disclosed as including a rope compartment, wherein the rope compartment is located on or near a vertical plane along a longitudinal axis of the vehicle, within reach of one or more occupant seats; a rope, wherein at least a portion of the rope is stored within the rope compartment and is securely tethered to a portion of a structure of the vehicle; and a rope compartment cover to secure the rope in the rope compartment. In one aspect, the rope is packed, loose, tied with a breakable or tearable material, stored in a bag or pouch. In one aspect the rope includes a flame-retardant material, a fluorescent material, a reflective material, or one or more light sources. In one aspect, the rope compartment includes one or more light sources. In one aspect, the rope compartment cover includes one or more light sources. In one aspect, the rope is securely tethered to at least a portion of the structure of the vehicle within the rope compartment or outside the rope compartment. In one aspect, one or more ropes are positioned within reach of every occupant seat.

In some embodiments of the disclosure, a method of supporting emergency egress from a vehicle is disclosed as including providing a rope in a rope compartment in an interior space of the vehicle on or near a vertical plane along a longitudinal axis of the vehicle, within reach of one or more occupant seats; permanently or semi-permanently securing the rope to a portion of a structure of the vehicle; and stowing at least a portion of the rope within the rope compartment. In one aspect, the rope is packed, loose, tied with a breakable or tearable material, stored in a bag or pouch. In one aspect, the rope includes a flame-retardant material, a fluorescent material, a reflective material, or one or more light sources. In one aspect, the rope compartment includes one or more light sources. In one aspect, the rope compartment includes one or more light sources. In one aspect, the rope is securely tethered to at least a portion of the structure of the vehicle within the rope compartment or outside the rope compartment. In one aspect, one or more ropes are positioned within reach of every occupant seat.

In some embodiments of the disclosure, an emergency egress kit is disclosed as including a rope compartment capable of being secured within an interior space of a vehicle on or near a vertical plane along a longitudinal axis of the vehicle, wherein the rope compartment is located within reach of one or more occupant seats; and a rope, wherein at least a portion of the rope is stored within the rope compartment and is capable of being securely tethered to a portion of a structure of the vehicle. In one aspect, one or more ropes are positioned within reach of every occupant seat. In one aspect, the rope is packed, loose, tied with a breakable or tearable material, stored in a bag or pouch. In one aspect, the rope includes a flame-retardant material, a fluorescent material, a reflective material, or one or more light sources. In one aspect, the kit further includes a rope compartment cover, wherein the rope compartment cover includes one or more light sources. In one aspect, the rope is securely tethered to at least a portion of a structure of the vehicle within the rope compartment or outside the rope compartment.

In some embodiments of the disclosure, a rotorcraft is disclosed as including a fuselage; one or more engines coupled to the fuselage; and at least one interior space including an emergency egress system, including a rope compartment, wherein the rope compartment is located on or near a vertical plane along a longitudinal axis of the rotorcraft, within reach of one or more occupant seats; a rope, wherein at least a portion of the rope is stored within the rope compartment and is securely tethered to a portion of a structure of the rotorcraft; and a rope compartment cover to secure the rope in the rope compartment. In one aspect, the rope is packed, loose, tied with a breakable or tearable material, or stored in a bag or pouch. In one aspect, the rope includes a flame-retardant material, a fluorescent material, a reflective material, or one or more light sources. In one aspect, the rope compartment cover includes one or more light sources. In one aspect, the rope is securely tethered to at least a portion of the structure of the vehicle within the rope compartment or outside the rope compartment. In one aspect, one or more ropes are positioned within reach of every occupant seat. In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
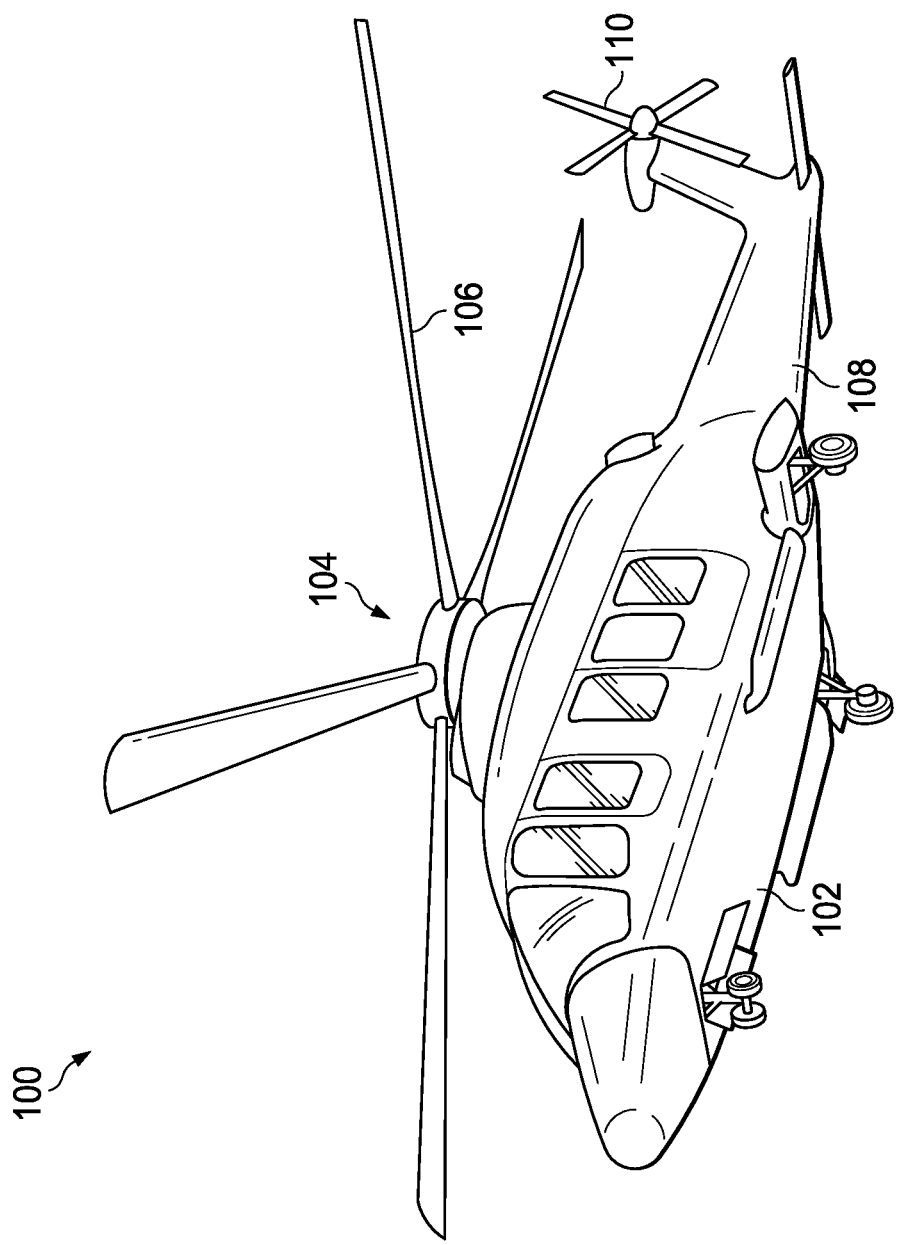
FIG. 1 shows a side view of a helicopter according to a particular embodiment of the present application.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
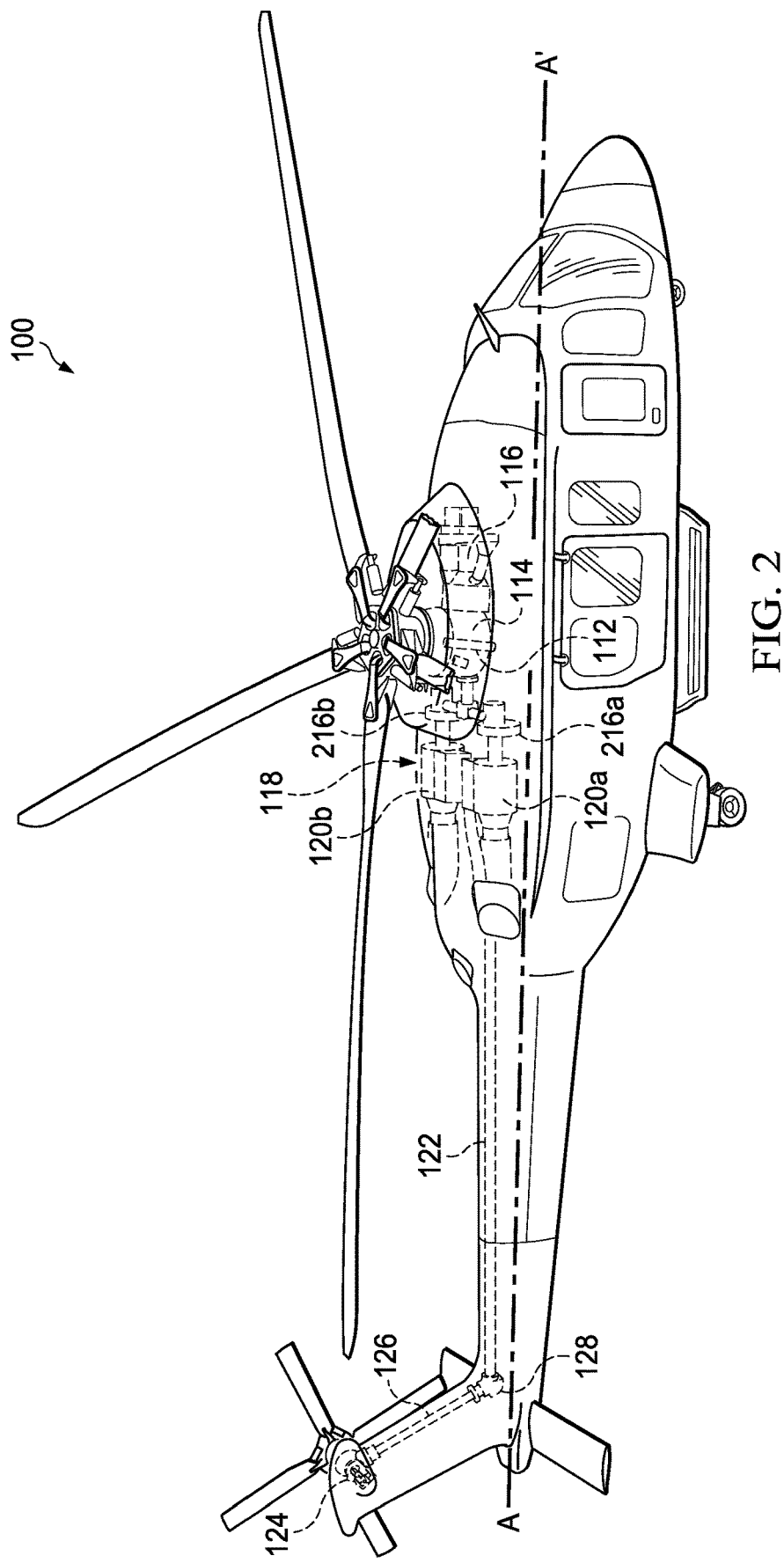
FIG. 2 shows a partial cross-section, perspective view of a helicopter according to an embodiment of the present application.

For example, FIG. 2 shows a partial cross-section perspective view of aircraft 100 that includes additional detail of the present invention. Aircraft 100 further includes a rotor mast 112, which is connected to the main rotor gearbox 114 via a main rotor mast. The main rotor gearbox 114 is connected to one or more accessory gear boxes 116 and one or more reduction gearboxes 216a, 216b. Each reduction gearbox 216a, 216b is connected to one or more engines 120a, 120b, which are within an engine compartment 118. A tail rotor drive shaft 122 transmits mechanical rotation to the tail rotor gear box 124, which is connected via tail rotor drive shaft 126 and intermediate gear box 128. There is a vertical plane along a longitudinal axis of the vehicle. As used herein, "vertical plane along a longitudinal axis of the vehicle" refers to the plane along a longitudinal axis of the vehicle that bisects the vehicle vertically into right and left (or starboard and port) halves. A longitudinal axis A-A' of the vehicle is shown in FIG. 2.

Figure 3:
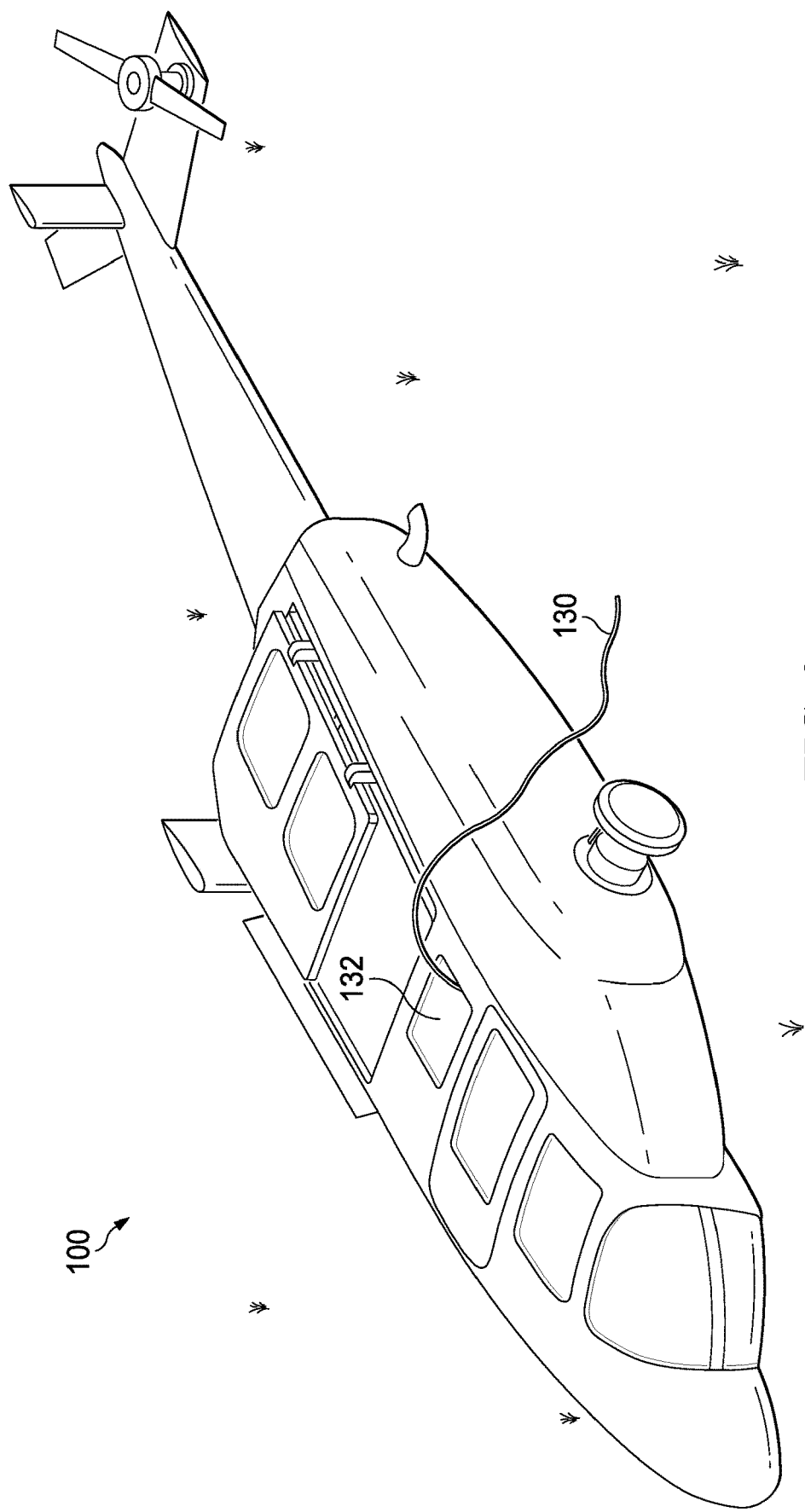
FIG. 3 shows a perspective view of a helicopter 100 lying on one side after an emergency landing.

FIG. 3 shows a perspective view of a helicopter 100 lying on one side after an emergency landing. In such a situation, some occupants need to climb up a row of seats to reach an exit, such as a push-out window at the end of a row. Once outside the exit, an occupant can use a rope 130 to complete the egress; the rope 130 is shown emerging from a push-out window 132, to reach the ground. The rope 130 can be used to exit from any push out window.

Figure 4:
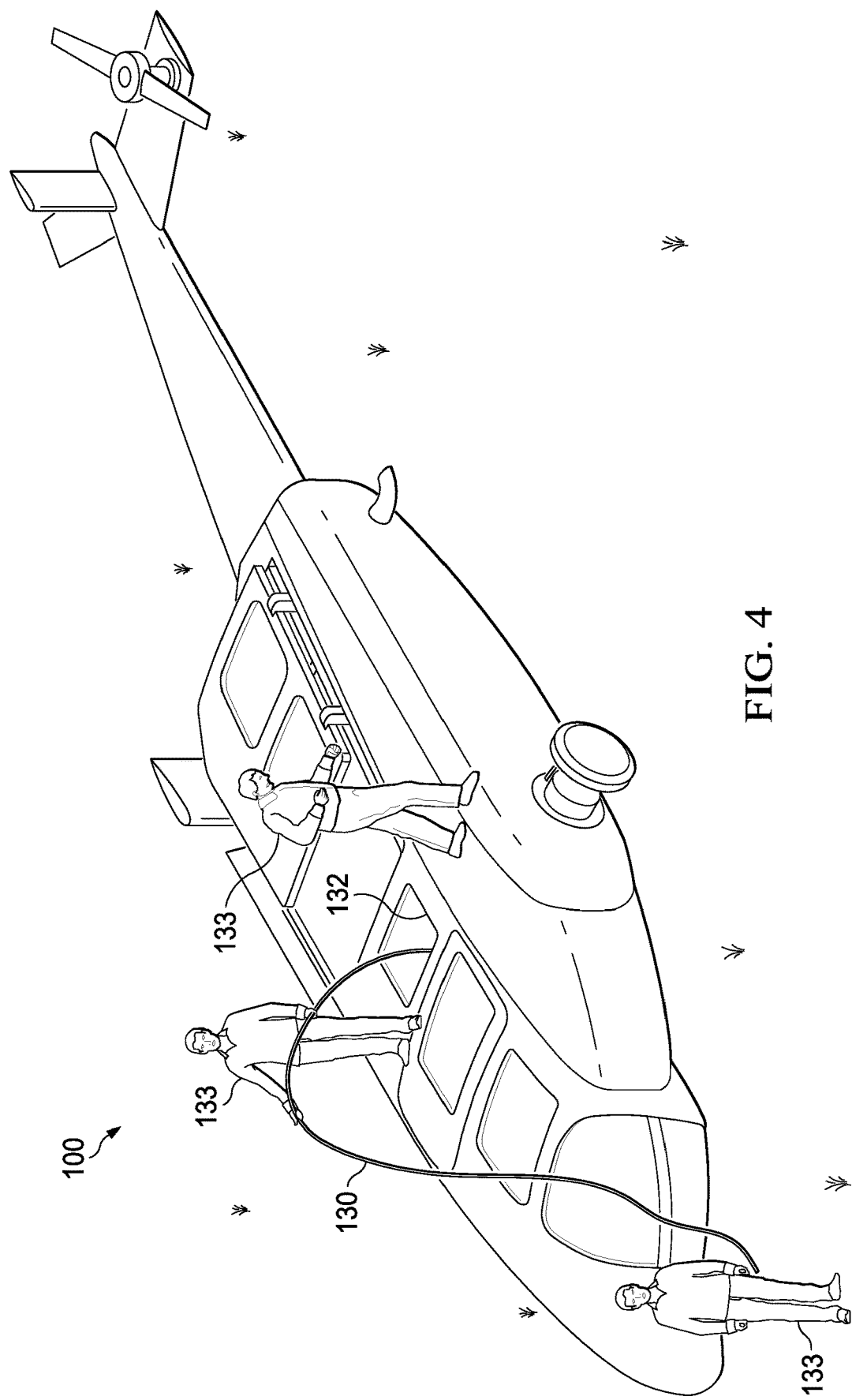
FIG. 4 shows another perspective view of the helicopter 100 lying on its side.

FIG. 4 shows another perspective view of the helicopter 100 lying on its side. Rope 130 is shown emerging from push-out window 132 and draped to the ground. Occupants 133, e.g., crew members or passengers, are shown in various positions on or near the helicopter 100 during or after egress, with one of the occupants 133 handling the rope 130.

In typical practice now, emergency egress rope equipment is stored in a pouch or a bag at a designated location on the aircraft, such as near a crew member or near an exit. During or after an emergency landing, the equipment would have to be located and the rope tethered securely to major element of aircraft structure using, e.g., a carabiner or other similar attachment device. During an emergency, the bag or pouch may be dislodged, or it might not have been stowed properly or in the correct location in the first place. In any event, the bag might be misplaced or lost in an emergency. Further, the rope might not be tethered securely during or after an emergency, and tethering it during or after the emergency uses valuable time.

Figure 5:
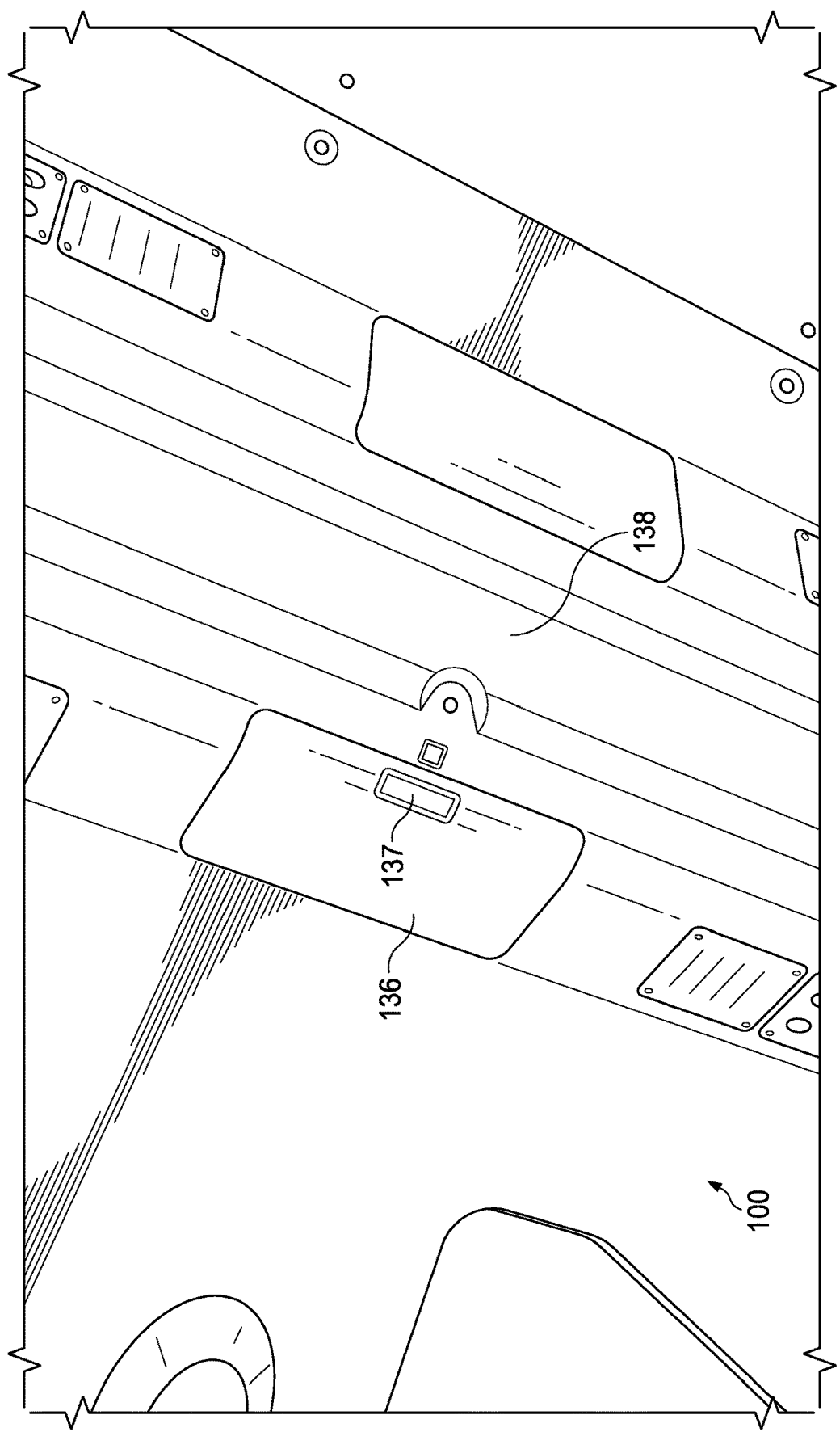
FIG. 5 shows the exterior of a closed rope compartment cover in an overhead storage bay in an interior space of a helicopter.

FIG. 5 shows the exterior of a closed rope compartment cover 136 in an overhead headliner panel 138 in an interior space of helicopter 100. The rope compartment cover 136 is a cover for retaining a rope 130 in a compartment 140 (not shown because rope compartment cover 136 is illustrated in place) shown in this figure with a finger relief, handle, or press-release latch 137. Compartment 140 is in a specific location to which some or all occupants 133 (such as crew members and passengers) have relatively easy access, such as on or near a vertical plane along a longitudinal axis (A-A') of the vehicle (commonly known as butt line zero), in the headliner panel 138 of a passenger cabin, as shown here.

Rope compartment 140 is shaped and size appropriately to store rope 130 and other items that might aid use of rope 130, e.g., lighting.

In an embodiment, the rope 130, which is any elongated, flexible device, including one or more strips or strands of material that is affixed to the aircraft, is stored within the compartment 140. The strips or strands can be twisted, braided, intertwined, or otherwise bound together to form a rope. In one embodiment, the rope includes material or materials sufficiently strong and is sized to meet regulatory requirements for bearing a load. In one embodiment of the present invention, the rope 130 is long enough to reach from the secure tethering point through an egress opening to the ground on which the vehicle rests, for example, for a Bell 525 helicopter, about 20 feet long.

The rope 130 is a packed rope, a loose rope, a rope that is tied with a string or tied with a breakable or tearable material such as safety tape, or may even be stored in a bag or pouch inside a rope compartment, and the bag or pouch may have a tearable or breakable feature such as a seam to make opening it easier. In an embodiment, the rope 130 is made of flame-retardant material, such as the material used for firefighters' rope, including for example, nylon, KEVLAR®, or TECHNORA®. In one embodiment, the rope 130 may also include a reflective or fluorescent material to provide a visual aid for egress and to meet regulatory requirements for light at the place the rope reaches the ground outside the vehicle. In embodiments in which the rope 130 includes fluorescent material, a light source can be installed in the rope compartment to charge the fluorescence. In another embodiment, the rope 130 can include one or more LEDs, light bulbs, or other light sources, strung together and braided into the rope 130, such that at least a portion of the rope 130 provides a source of illumination.

In one embodiment, the rope 130 is one of a plurality of ropes, stored together in a single rope compartment 140 or in some combination of rope compartments 140. In an embodiment, the rope 130 has a single securely tethered end and a plurality of branches branching out from the single securely tethered end or from a point near that end.

In one embodiment, the rope 130 may also be made of a soft material to reduce or prevent injuries to occupants using the rope, such as rope burn, or the rope 130 may include a sleeve with bumps, steps, or grip points to aid in egress or ingress.

Within or near the rope compartment, one end of the rope 130 is securely tethered during normal, non-emergency operations to a portion of the structure of the helicopter 100 such as the forward lift frame (not shown). The present invention permits a reasonably accessible, stationary location for the rope 130, secure tethering of the rope 130 to the helicopter 100 before an emergency rather than during or after an emergency, thus saving time during or after an emergency. In one embodiment, an end of the rope 130 that is not securely tethered to a portion of the structure of the vehicle is attached to the cover 136 of the rope compartment 140 such that opening the cover 136 places the untethered end of the rope 130 near at hand for the occupant 133 opening the compartment, or the rope 130 may partially deploy when the cover 136 is opened, speeding the process of deploying the rope 130 from the rope compartment 140 for use.

In one embodiment, the rope compartment cover 136 is detachable and may also serve as a weight on the end of the rope 130 that is not securely tethered to a portion of the structure of the vehicle, e.g., to aid in throwing the unsecured end of the rope out of the vehicle. In other embodiments, an end of the rope 130 that is not securely tethered to a portion of the structure of the vehicle is weighted with an object such as a sandbag to aid in throwing the untethered end of the rope out of the vehicle. In other embodiments, the rope compartment cover 136 remains attached to or near the rope compartment 140 after the rope 130 is deployed from the rope compartment 140. The rope compartment cover 136 may also include a source of illumination, such that vehicle occupants can see the ground and area surrounding the vehicle, e.g., light-emitting diodes, fluorescent lights, or incandescent lights. Such a source of illumination may be manually activated or automatically activated by, e.g., opening or removing the rope compartment cover 136. The rope compartment cover 136 is held shut with the rope 130 within by a variety of mechanisms, such as one or more latches or VELCRO® patches. The rope compartment cover 136 may bear instructions for use of the present invention.

In one embodiment of the present invention, an emergency egress kit includes the rope 130, a compartment 140, and a compartment cover 136. Such a kit may be included integrally within the vehicle or attached to the interior of a compartment of the vehicle.

Figure 6:
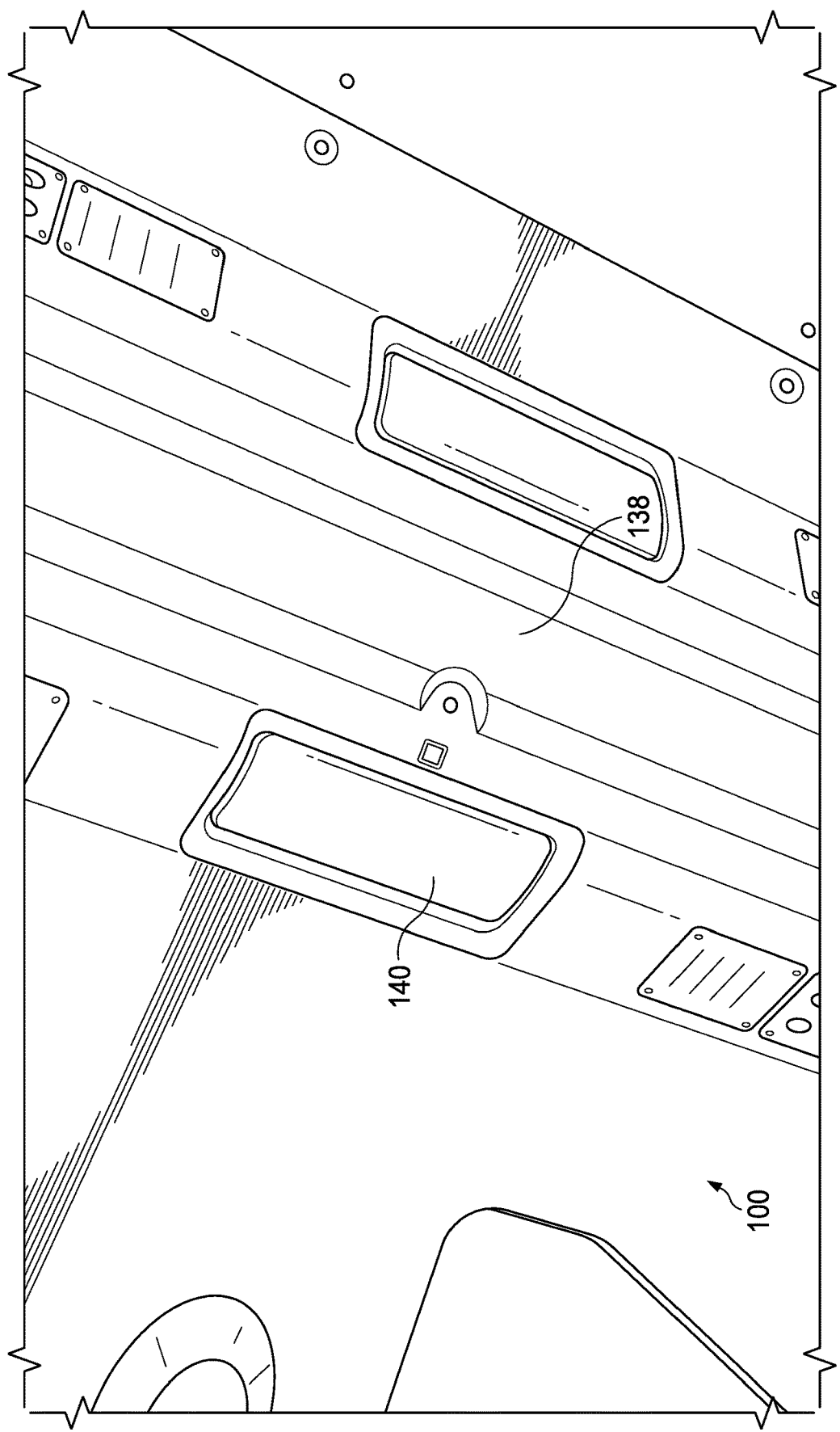
FIG. 6 shows an open rope compartment without a cover.

FIG. 6 shows an interior of helicopter 100 with open rope compartment 140 in headliner panel 138 without the cover 136 (not shown). As noted above, the rope compartment 140 may be located on or near the vertical plane along the longitudinal axis of the vehicle (butt line zero), within reasonable reach of occupants 133 (not shown) of the vehicle.

Figure 7A:
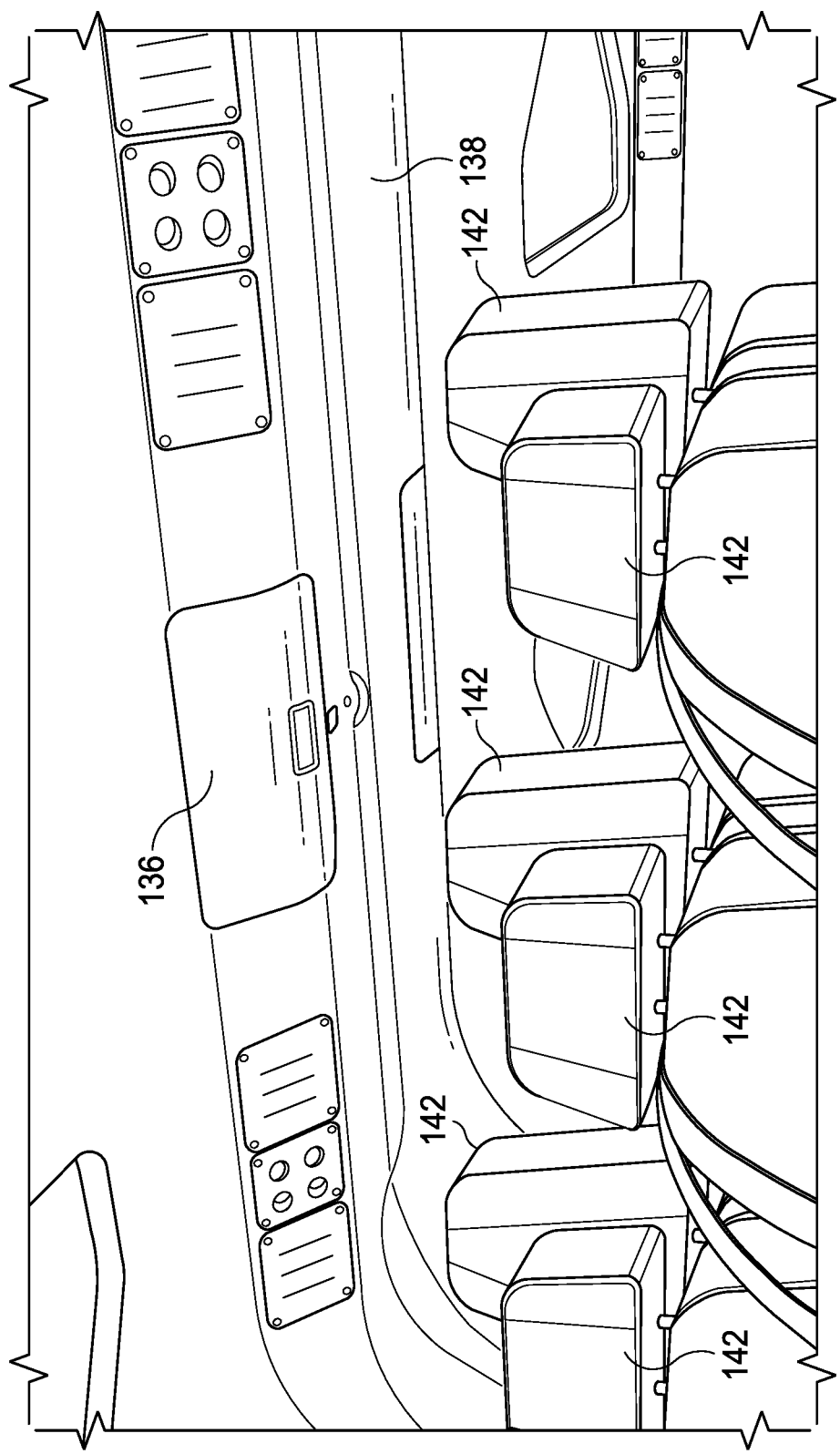
FIGS. 7A and 7B illustrate the exterior of a closed rope compartment cover centrally located over some exemplary occupant seats.
Figure 7B:
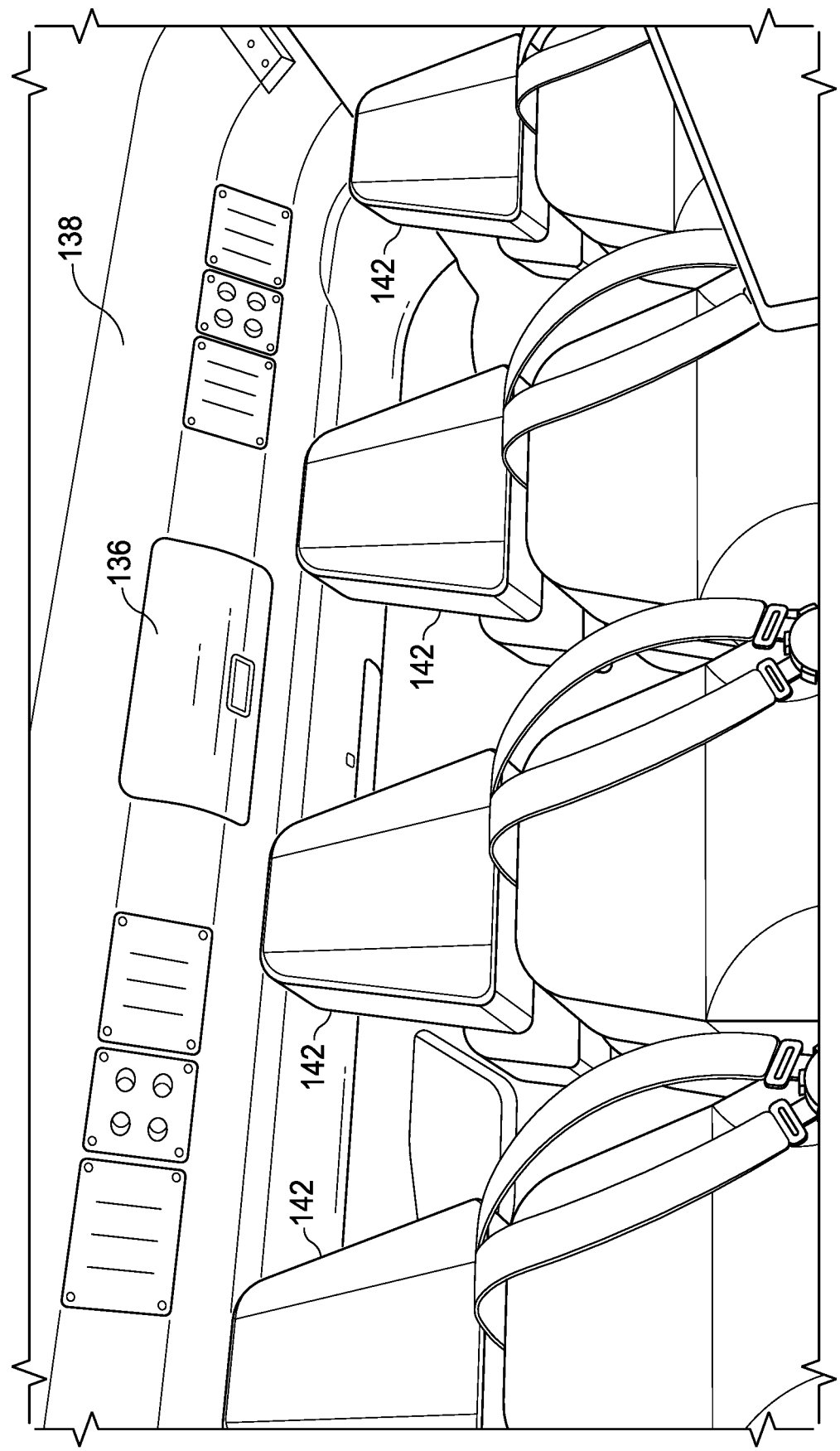

FIGS. 7A and 7B illustrate the exterior of a closed rope compartment cover 136 in headliner panel 138 located on or near the vertical plane along the longitudinal axis of the vehicle, over some exemplary occupant seats 142. As noted above, the cover 136 may include features that aid with deployment of rope 130 or with lighting.

The rope compartment 140 may be located at various places within the interior of a vehicle, such as the passenger compartment or the crew compartment. It is located within reach of the smallest reasonably expected occupant within the vehicle in any orientation in an emergency landing, for example, on or in an overhead headliner panel 138 on the vertical plane along the longitudinal axis of the vehicle, as illustrated herein. The rope compartment 140 can be integrated with other features of the vehicle such as the ceiling panels of an interior space, or it can be attached separately to one or more features of the vehicle, for example, bolted to the ceiling of an interior space.

In one embodiment, the helicopter 100 may have one or more sensors to detect when the helicopter 100 is on its side and to turn on emergency lights to shows the one or more push-out windows 132 or the rope compartment cover 136 or to open the rope compartment cover 136. In another embodiment, the one or more sensors may be included in the compartment cover 136.

Figure 8:
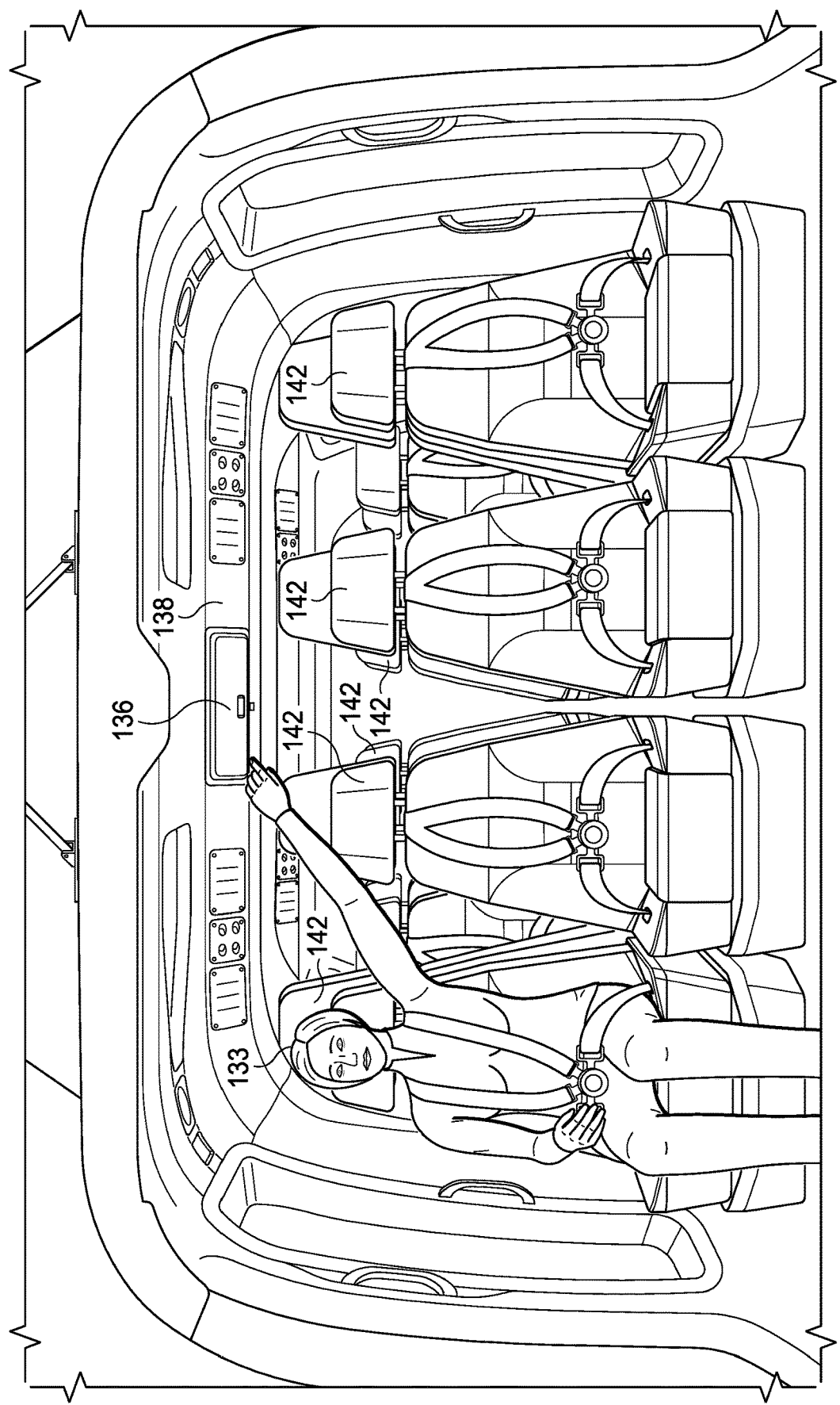
FIG. 8 depicts an occupant reaching up to open the rope compartment cover in an overhead storage bay.

FIG. 8 depicts an occupant 133, e.g., a crew member or a passenger, secured in her seat reaching up to open the rope compartment cover 136 in overhead headliner panel 138. In this embodiment, rope compartment cover 136, covering compartment 140 (not shown), is within reach of occupants 133 secured in seats 142 (those illustrated and those not shown because hidden by illustrated seats 142).

Figure 9:
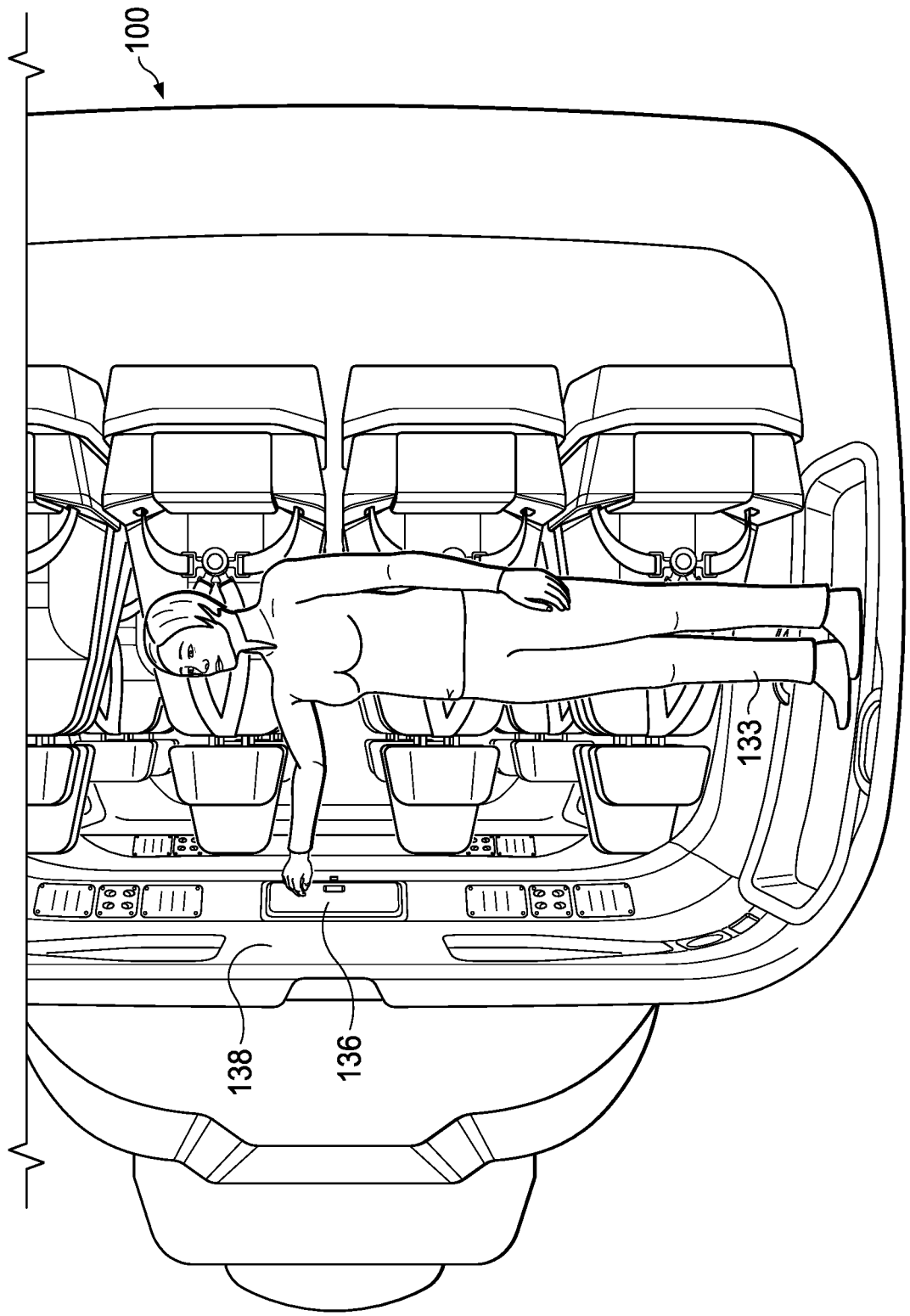
FIG. 9 illustrates an occupant after an emergency landing, standing inside the passenger cabin with the helicopter on its side and reaching out to open the rope compartment cover.

FIG. 9 illustrates an occupant 133 after an emergency landing, standing inside the passenger cabin with the helicopter 100 on its side and reaching out to open the rope compartment cover 136 in headliner panel 138. Rope compartment cover 136, covering compartment 140 (not shown)

is positioned in the illustrated embodiment to give ready access to an occupant 133 even when the helicopter 100 is in such an orientation.

Figure 10:
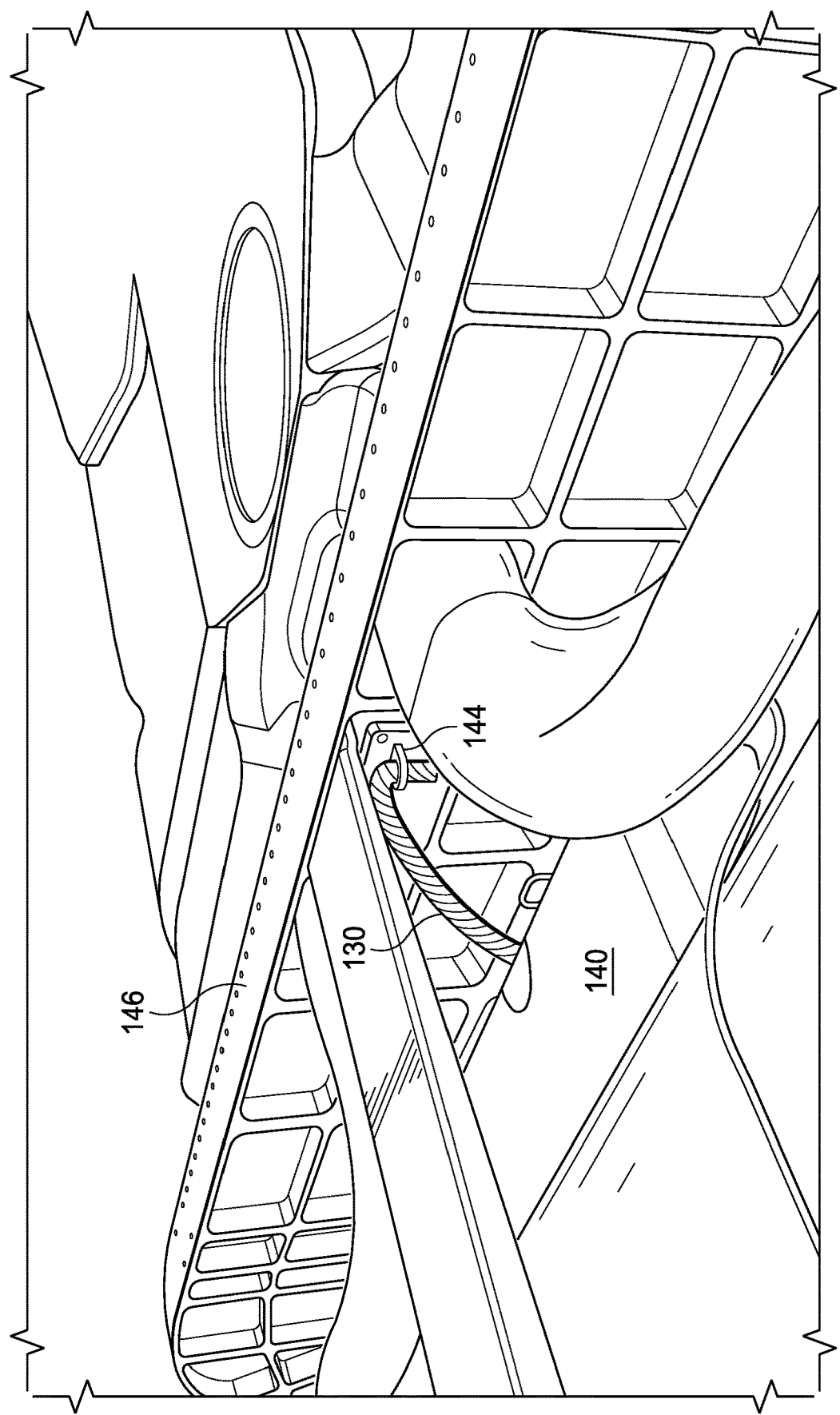
FIG. 10 shows a perspective view in which the rope is secured to the aircraft structure.

FIG. 10 shows a perspective view to show one example in which the rope is secured to a portion of an aircraft structure such as forward lift frame 146 by any secure means, such as the exemplary bracket 144 shown, a loop in the rope 130, an eyelet, a secure knot, a carabiner, a D-ring, some similar device, or some combination of these. In this embodiment, rope 130 emerges from rope compartment 140 and runs to a bracket 144 on a forward lift frame 146 at which the rope 130 is secured.

Figure 11:
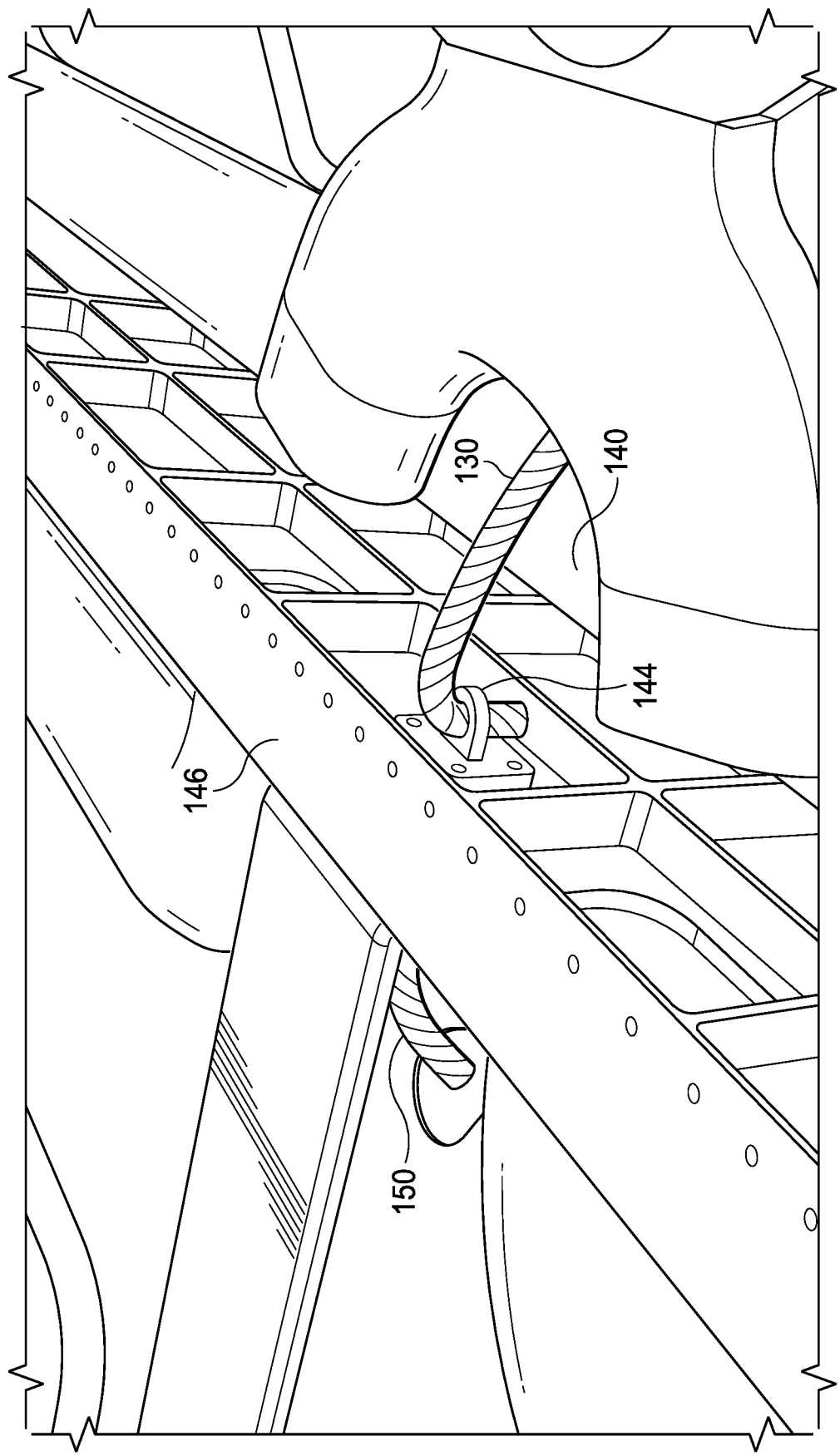
FIG. 11 shows another perspective view of the bracket.

FIG. 11 shows another perspective view of the bracket 144 and includes an illustration of a second rope 150 on the other side of the forward lift frame 146 emerging from another rope compartment 140 (not shown). In one embodiment, the rope 130 is securely tethered to a portion of the structure of the vehicle such as the forward lift frame 146 by any secure means, such as the exemplary bracket 144 shown, or those discussed above. Rope 130 may also be secured to an object that is secured to a portion of the structure of the vehicle. Rope 150 may be similarly securely tethered, either to a portion of the airframe or to an object that a secured to a portion of the airframe.

Figure 12:
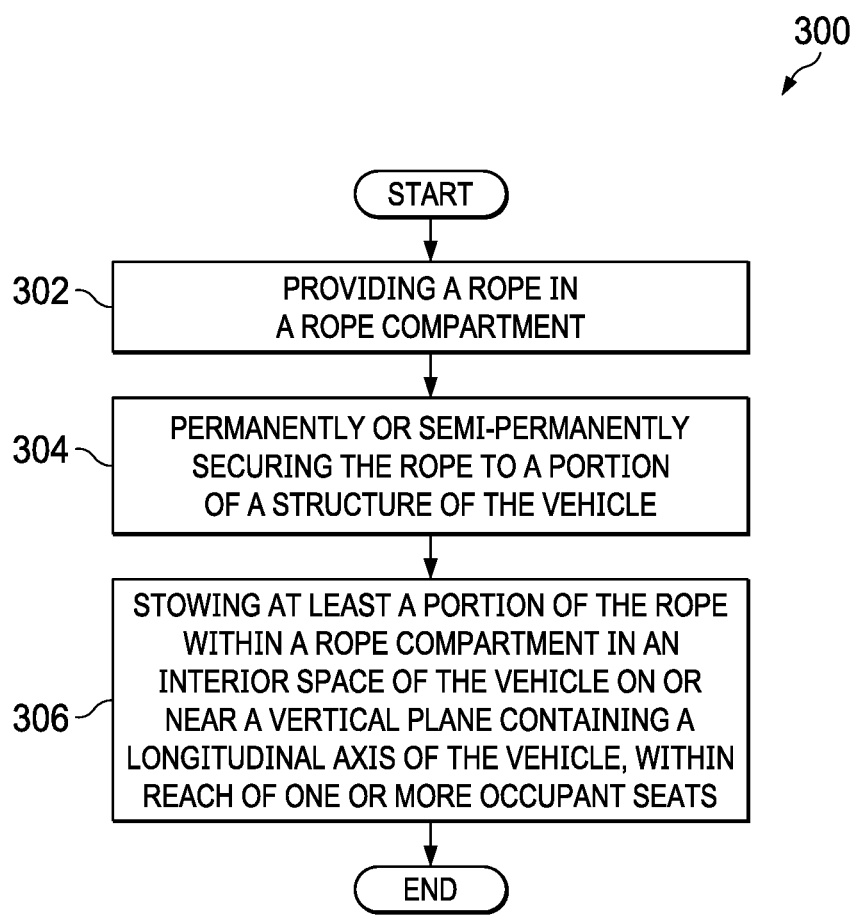
FIG. 12 is a flowchart of a method of supporting emergency egress from a vehicle.

FIG. 12 a flowchart of a method 300 of supporting emergency egress from a vehicle, illustrating an embodiment of the present invention. Method 300 includes block 302, providing a rope in a rope compartment; block 304, permanently or semi-permanently securing the rope to a portion of a structure of the vehicle, such as forward lift frame; and block 306, stowing at least a portion of the rope within a rope compartment in an interior space of the vehicle on or near the longitudinal axis of the vehicle.

The skilled artisan will recognize that the present invention can be used in a variety of vehicles such as helicopter 100, tiltrotor aircraft, and fixed-wing aircraft, to list some non-limiting examples.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

What is claimed is:

1. An emergency egress system of a vehicle, comprising:
   a rope compartment, wherein the rope compartment is located overhead and on a vertical plane along a longitudinal axis of the vehicle, within reach of all seated occupants of the vehicle, and wherein the rope compartment comprises one or more light sources;
   a rope, wherein at least a portion of the rope is stored within the rope compartment and is securely tethered to a portion of a structure of the vehicle, wherein the rope comprises a fluorescent material, wherein the one or more light sources of the rope compartment charge the fluorescent material of the rope, and wherein the rope further comprises a weight attached to an end of the rope not securely tethered to the portion of the structure of the vehicle to aid in throwing the weighted end out of the vehicle; and
   a rope compartment cover to secure the rope in the rope compartment.

2. The system of claim 1, wherein the rope is packed, loose, tied with a breakable or tearable material, stored in a bag or pouch.

3. The system of claim 1, wherein the rope further comprises a flame-retardant material or a reflective material.

4. The system of claim 1, wherein the rope compartment cover comprises one or more light sources.

5. The system of claim 1, wherein the rope is securely tethered to at least a portion of the structure of the vehicle within the rope compartment or outside the rope compartment.

6. A method of supporting emergency egress from a vehicle, comprising:
   providing a rope in a rope compartment in an interior space of the vehicle overhead and on a vertical plane along a longitudinal axis of the vehicle, within reach of all seated occupants of the vehicle, wherein the rope compartment comprises one or more lights, wherein the rope comprises a fluorescent material, and wherein the one or more light sources of the rope compartment charge the fluorescent material of the rope, and wherein the rope further comprises a weight attached to an end of the rope not securely tethered to the portion of the structure of the vehicle to aid in throwing the weighted end out of the vehicle;
   permanently or semi-permanently securing the rope to a portion of a structure of the vehicle; and
   stowing at least a portion of the rope within the rope compartment.

7. The method of claim 6, wherein the rope is packed, loose, tied with a breakable or tearable material, stored in a bag or pouch.

8. The method of claim 6, wherein the rope further comprises a flame-retardant material or a reflective material.

9. The method of claim 6, wherein the rope compartment cover comprises one or more light sources.

10. The method of claim 6, wherein the rope is securely tethered to at least a portion of the structure of the vehicle within the rope compartment or outside the rope compartment.

11. An emergency egress kit of a vehicle, comprising:
    a rope compartment capable of being secured within an interior space of a vehicle overhead and on a vertical plane along a longitudinal axis of the vehicle, wherein the rope compartment is located within reach of all seated occupants of the vehicle, and wherein the rope compartment comprises one or more light sources; and
    a rope, wherein at least a portion of the rope is stored within the rope compartment and is capable of being securely tethered to a portion of a structure of the vehicle, wherein the rope comprises a fluorescent material, wherein the one or more light sources of the rope compartment charge the fluorescent material of the rope, and wherein the rope further comprises a weight attached to an end of the rope not securely tethered to the portion of the structure of the vehicle to aid in throwing the weighted end out of the vehicle.

12. The kit of claim 11, wherein the rope is packed, loose, tied with a breakable or tearable material, stored in a bag or pouch.

13. The kit of claim 11, wherein the rope further comprises a flame-retardant material or a reflective material.

14. The kit of claim 11, further comprising a rope compartment cover, wherein the rope compartment cover comprises one or more light sources.

15. The kit of claim 11, wherein the rope is securely tethered to at least a portion of a structure of the vehicle within the rope compartment or outside the rope compartment.

16. A rotorcraft, comprising:
    a fuselage;
    one or more engines coupled to the fuselage; and
    at least one interior space comprising an emergency egress system comprising:
      a rope compartment, wherein the rope compartment is located overhead and on a vertical plane along a longitudinal axis of the rotorcraft, within reach of all seated occupants of the rotorcraft, and wherein the rope compartment comprises one or more light sources;
      a rope, wherein at least a portion of the rope is stored within the rope compartment and is securely tethered to a portion of a structure of the rotorcraft, wherein the rope comprises a fluorescent material, wherein the one or more light sources of the rope compartment charge the fluorescent material of the rope, and wherein the rope further comprises a weight attached to an end of the rope not securely tethered to the portion of the structure of the vehicle to aid in throwing the weighted end out of the vehicle; and
      a rope compartment cover to secure the rope in the rope compartment.

17. The rotorcraft of claim 16, wherein the rope is packed, loose, tied with a breakable or tearable material, or stored in a bag or pouch.

18. The rotorcraft of claim 16, wherein the rope comprises a flame-retardant material or a reflective material.

19. The rotorcraft of claim 16, wherein the rope compartment cover comprises one or more light sources.

20. The rotorcraft of claim 16, wherein the rope is securely tethered to at least a portion of the structure of the vehicle within the rope compartment or outside the rope compartment.

\* \* \* \* \*